(12) United States Patent
Arrasvuori et al.

(10) Patent No.: US 8,631,436 B2
(45) Date of Patent: Jan. 14, 2014

(54) METHOD AND APPARATUS FOR PRESENTING MEDIA SEGMENTS

(75) Inventors: Juha Henrik Arrasvuori, Tampere (FI); Erika Piia Pauliina Reponen, Tampere (FI)

(73) Assignee: Nokia Corporation, Espoo (FI)

( * ) Notice: Subject to any disclaimer, the term of this patent is extended or adjusted under 35 U.S.C. 154(b) by 362 days.

(21) Appl. No.: 12/626,121

(22) Filed: Nov. 25, 2009

(65) Prior Publication Data

US 2011/0126236 A1 May 26, 2011

(51) Int. Cl.
*H04N 5/445* (2011.01)

(52) U.S. Cl.
USPC .................................. 725/45; 725/46; 725/47

(58) Field of Classification Search
USPC ....................................................... 725/45–47
See application file for complete search history.

(56) References Cited

U.S. PATENT DOCUMENTS

| | | | |
|---|---|---|---|
| 5,983,214 A * | 11/1999 | Lang et al. ............................... | 1/1 |
| 6,295,092 B1 * | 9/2001 | Hullinger et al. ............. | 348/468 |
| 6,684,399 B1 | 1/2004 | Grooters | |
| 7,222,354 B1 | 5/2007 | Ching et al. | |
| 7,496,947 B1 | 2/2009 | Meyers | |
| 7,584,483 B2 * | 9/2009 | Ichioka ............................ | 725/9 |
| 2002/0049974 A1 | 4/2002 | Shnier | |
| 2002/0063681 A1 | 5/2002 | Lan et al. | |
| 2002/0073424 A1 | 6/2002 | Ward, III et al. | |
| 2004/0066395 A1 * | 4/2004 | Foreman et al. ............... | 345/716 |
| 2007/0022454 A1 | 1/2007 | Yoon et al. | |
| 2007/0033632 A1 | 2/2007 | Baynger et al. | |
| 2007/0058933 A1 | 3/2007 | Kobayashi | |
| 2007/0240072 A1 | 10/2007 | Cunningham et al. | |
| 2007/0288638 A1 | 12/2007 | Vuong et al. | |
| 2008/0036849 A1 | 2/2008 | Oh et al. | |
| 2008/0307467 A1 | 12/2008 | Kim et al. | |
| 2009/0055759 A1 | 2/2009 | Svendsen | |
| 2009/0063496 A1 * | 3/2009 | Cunningham et al. .......... | 707/10 |
| 2009/0070363 A1 | 3/2009 | Bull | |
| 2010/0125885 A1 * | 5/2010 | Sauhta .......................... | 725/101 |

FOREIGN PATENT DOCUMENTS

| | | |
|---|---|---|
| CA | 2 281 440 A1 | 3/2000 |
| CN | 100356791 C | 12/2007 |
| KR | 20090007809 A | 1/2009 |
| WO | WO 0213521 A1 | 2/2002 |
| WO | WO 2006/131887 A1 | 12/2006 |

OTHER PUBLICATIONS

International Search Report and Written Opinion for corresponding PCT App. PCT/FI2010/050879 dated Apr. 6, 2011, pp. 1-14.

(Continued)

*Primary Examiner* — Hunter B Lonsberry
(74) *Attorney, Agent, or Firm* — Ditthavong Mori & Steiner, P.C.

(57) ABSTRACT

An approach is provided for presenting media segments. A media segment manager receives an input, from a device, for specifying a plurality of segments. Each of the plurality of segments corresponds to one or more media streams and is associated with a respective duration of time. The media segment manager then causes, at least in part, presentation of the plurality of segments in a predetermined order based on the input and the respective durations of time.

21 Claims, 15 Drawing Sheets

(56) References Cited

OTHER PUBLICATIONS

Join or Merge Multiple Videos into One Single File, May 7, 2010, http://www.zhacks.com/2010/05/07/join-or-merge-multiple-videos-into-one-single-file, pp. 1-3.

European Search Report corresponding to Application No. 10832693.5, issued on May 16, 2013.

Chinese Office Action corresponding to Application No. 201080053398.5, issued on Apr. 3, 2013.

* cited by examiner

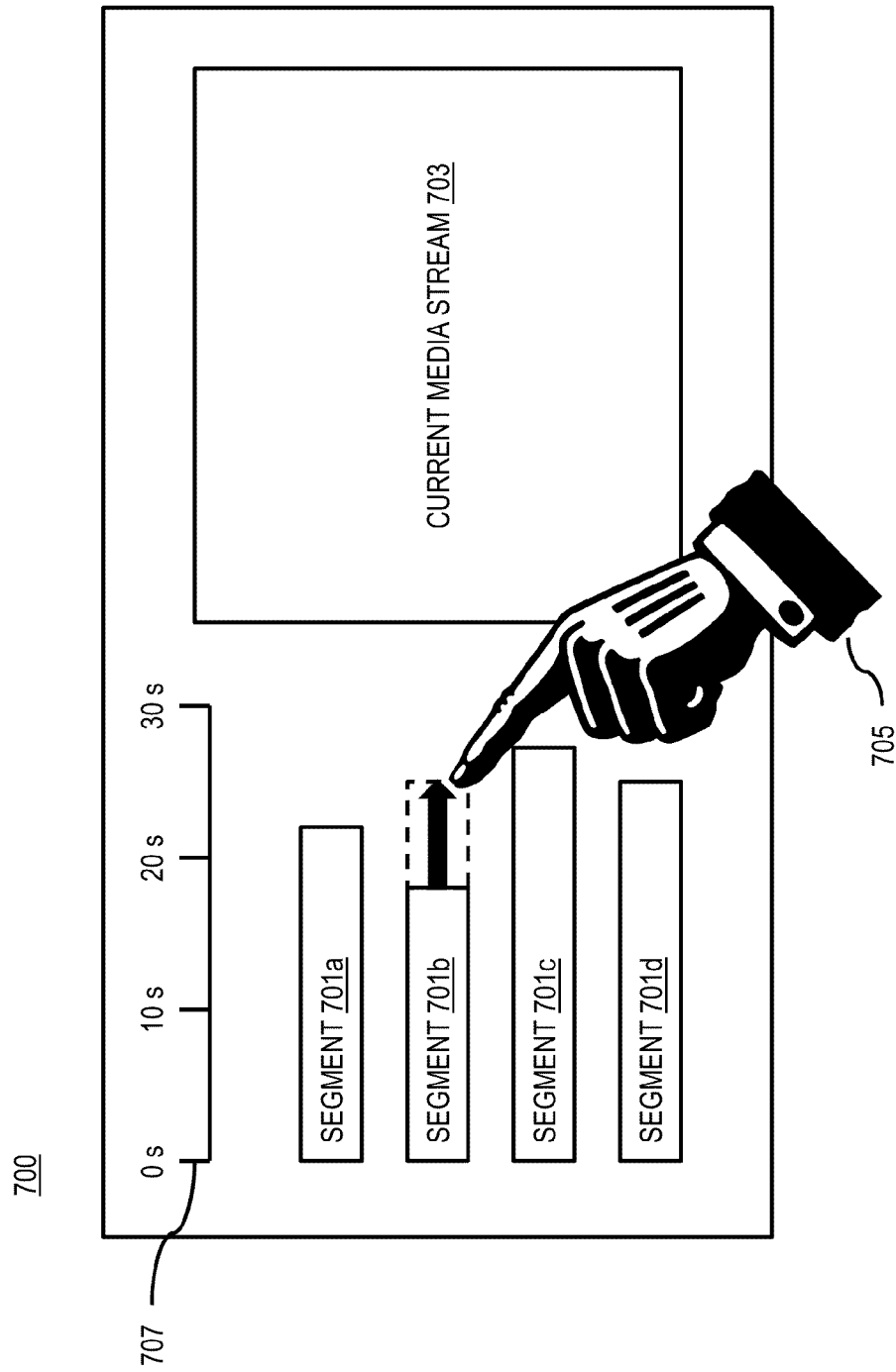

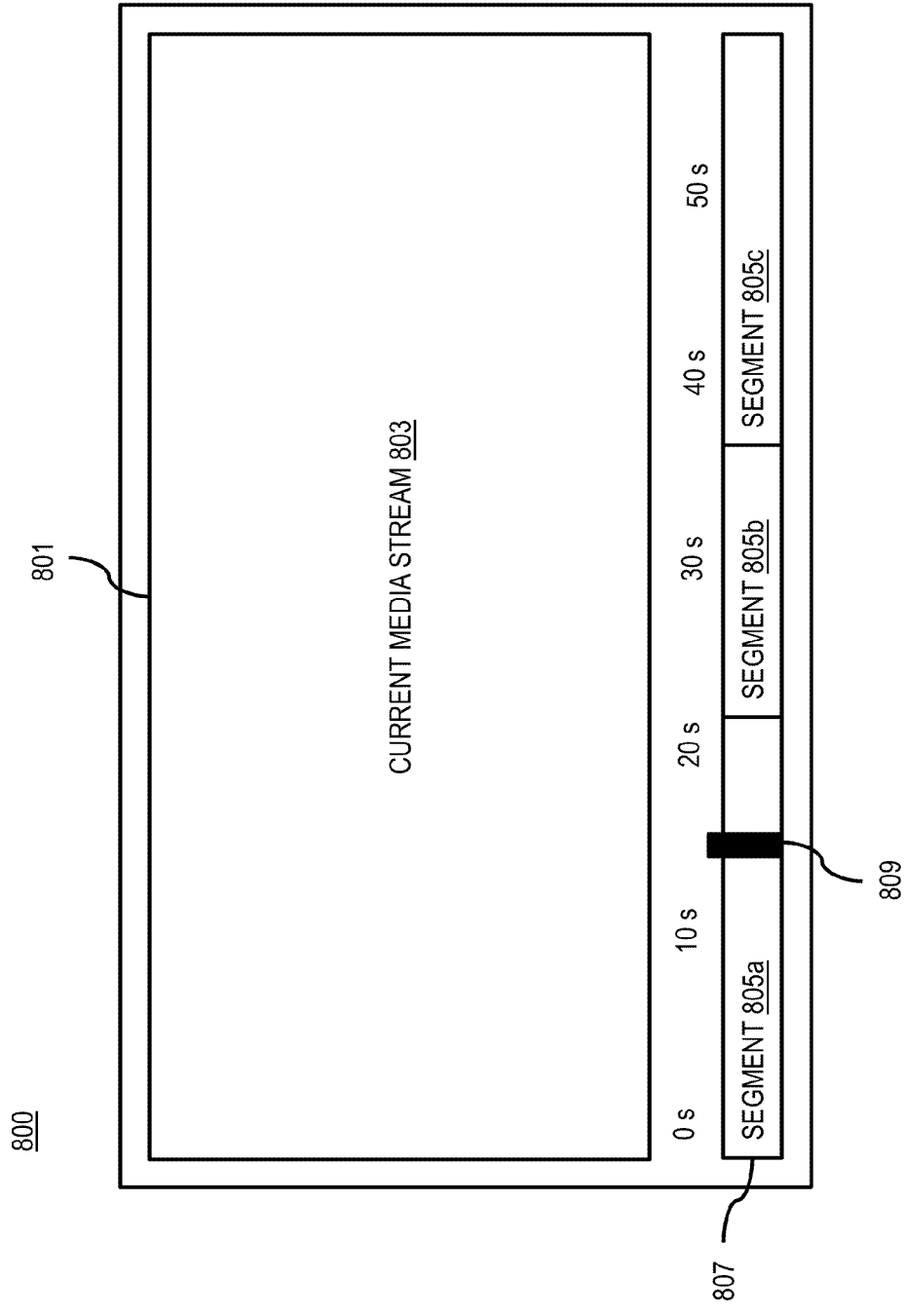

FIG. 10

|  | FAVORITES | RECOMMENDED | FROM NEW YORK | OTHER |
|---|---|---|---|---|
| PAST | | | | |
| LIVE | | | | |
| FUTURE | | | | |

METHOD AND APPARATUS FOR PRESENTING MEDIA SEGMENTS

BACKGROUND

Service providers and device manufacturers are continually challenged to deliver value and convenience to consumers by, for example, providing compelling network services and advancing the underlying technologies. One area of interest has been the development of services and technologies for media and content sharing (e.g., live video feeds, broadcast television on mobile device, etc.). As a result, there are thousands of media sources available through the Internet and other broadcast networks (e.g., live video feeds, broadcast television, radio, etc.). This ever expanding library of media sources, however, can pose significant technical challenges for service providers and device manufacturers to provide effective mechanisms for enabling a user to select media sources that provide content of interest to the user without the burden of sifting through a vast collection of content.

SOME EXAMPLE EMBODIMENTS

Therefore, there is a need for an approach for efficiently presenting media sources and content in segments that are relevant to the user.

According to one embodiment, a method comprises receiving an input, from a device, for specifying a plurality of segments. Each of the plurality of segments corresponds to one or more media streams and is associated with a respective duration of time. The method also comprises causing, at least in part, presentation of the plurality of segments in a predetermined order based on the input and the respective durations of time.

According to another embodiment, an apparatus comprising at least one processor, and at least one memory including computer program code, the at least one memory and the computer program code configured to, with the at least one processor, cause, at least in part, the apparatus to receive an input, from a device, for specifying a plurality of segments. Each of the plurality of segments corresponds to one or more media streams and is associated with a respective duration of time. The apparatus also causes presentation of the plurality of segments in a predetermined order based on the input and the respective durations of time.

According to another embodiment, a computer-readable storage medium carrying one or more sequences of one or more instructions which, when executed by one or more processors, cause, at least in part, an apparatus to receive an input, from a device, for specifying a plurality of segments. Each of the plurality of segments corresponds to one or more media streams and is associated with a respective duration of time. The apparatus also causes presentation of the plurality of segments in a predetermined order based on the input and the respective durations of time.

According to another embodiment, an apparatus comprises means for receiving an input, from a device, for specifying a plurality of segments. Each of the plurality of segments corresponds to one or more media streams and is associated with a respective duration of time. The apparatus also comprises means for causing, at least in part, presentation of the plurality of segments in a predetermined order based on the input and the respective durations of time.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A and 7B are diagrams of user interfaces used in the process of FIG. 6 for modifying the duration and content, respectively, of a media segment, according to one embodiment;

FIGS. 8A and 8B are diagrams of alternate user interfaces used in the process of FIG. 3 for presenting media segments, according to various embodiments;

FIG. 10 is a diagram of a user interface used in the process of FIG. 10 for presenting media streams in a programming guide, according to one embodiment;

DESCRIPTION OF SOME EMBODIMENTS

Examples of a method, apparatus, and computer program for presenting media segments are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
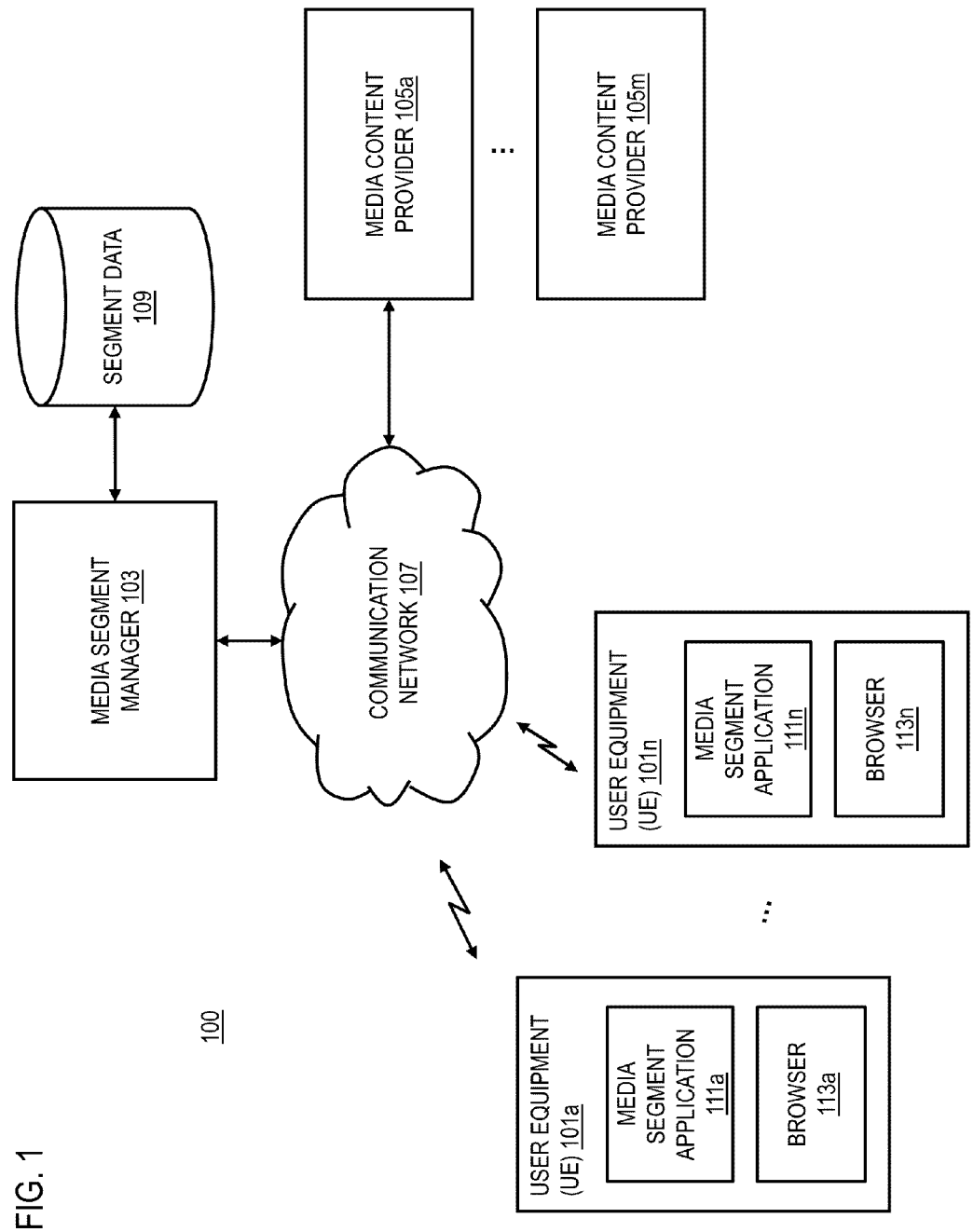
FIG. 1 is a diagram of a system capable of presenting media segments, according to one embodiment.

FIG. 1 is a diagram of a system capable of presenting media segments, according to one embodiment. As noted previously, users can quickly become overwhelmed by the vast number of programming content and choices available over modern broadcast and telecommunications networks. For example, these programming choices include media sources available over the Internet, broadcast systems, cable systems, proprietary data networks, and the like. Further, a significant portion of these programming choices are available as live feeds (e.g., traditional broadcast television, live video or audio feeds such as podcasts, etc.) that are easy for consumers to miss. Accordingly, a user may find it quite challenging to be able to select one or more programs of interest to from among the library of available content. Moreover, users often want to follow several media sources at once (e.g., multiple sporting events, live video feeds from a group of friends, multiple television channels, etc.), but traditionally only one of the media sources can be shown at the same time, particularly on a mobile device with a limited display area. It is noted, however, that even if multiple media sources are displayed at the same time, a user can typically concentrate on only one media source at a time. Historically, users have had to rely on "channel surfing" (e.g., scanning sequentially from channel to channel in an order preprogrammed into the media player or in the order of the broadcast channel frequency) to scan available programming choices to find a program of interest without resorting to a programming guide or a search function.

To address this problem, the system 100 of FIG. 1 introduces the capability to define media segments for displaying one or more media sources or media streams from those sources (e.g., live video feeds, audio feeds, broadcast television, streaming media, etc.) for a predetermined duration or period of time. In other words, as used herein, a media segment is one or more media streams presented for a specific amount of time. In one embodiment, multiple segments can be presented in a predetermined to order to provide, for instance, "interactive channel hopping," whereby the user defines the duration for how long each segment (e.g., containing one or more media streams or sources) is presented before the next segment is presented. In one embodiment, the user may manually specify one or more of media streams that are to be presented in each segment. For example, the user may selected the media stream by selecting the media source (e.g., Internet address of a video feed, broadcast channel frequency, file location, etc.) associated with the stream. It is contemplated that any number of segments may be presented as a set. At the end of the final segment, the presentation can begin again from the first segment. Because many of the media streams are live, the looping of the segments generally results in display of different media content or different portions of media content as segments are repeated. In this way, the user can follow and control the presentation of multiple media sources.

In a sample use case, a user may define, for instance, four media segments (e.g., Segments 1-4). The media segments are configured to play in a looping sequential order with Segment 1 playing for 90 seconds, Segment 2 for 60 seconds, Segment 3 for 15 seconds, and Segment 4 for 120 seconds. The sequence of segments is then repeated until the user stops the loop. In this example, the user specifies a mix of manually and automatically selected media sources to play during each segment. For example, in Segment 1, the user specifies that a live football game on a particular television channel is to be presented. In Segment 2, the user defines criteria for automatically selecting live videos feeds that are shared by the user's friends from a social networking web site. Accordingly, when it is Segment 2's turn to be played, the system 100 applies the criteria (e.g., searches the social networking web site for live videos feeds originating from any of the user's defined friends) and plays any live video feeds that meet the criteria during the time period (e.g., 60 seconds) allotted to Segment 2. If more than one live video feeds meet the criteria, the system 100 may play just one of the video feeds during the allotted time and then play another one of the video feeds in the next loop of media segments. Alternatively, the system 100 may allot a certain portion of the allotted time for playing each of the matching video feeds during the allotted time for the video segment. In Segment 3, the user may specify playing of a live news radio broadcast. In Segment 4, the user may specify criteria for selecting photographs available from a photo sharing website that are related to the football team watched in during Segment 1. The system 100 then queries the photo sharing website using, for instance, an application programming interface specific to site to retrieve the photos and initiates a slideshow of the photographs for the duration of the segment. The system 100 can then present an continuous loop of the four segments to provide interactive or user-defined channel hopping over a variety of available media sources.

As shown in FIG. 1, system 100 comprises one or more user equipment (UEs), e.g., UEs 101*a*-101*n*, having connectivity to a media segment manager 103 and one or more media content providers 105*a*-105*m* via a communication network 107. For the sake of simplicity, FIG. 1 depicts only two UEs (e.g., UEs 101*a*-101*n*) in the system 100. However, it is contemplated that the system may support any number of UEs 101 up to the maximum capacity of the communication network 107. For example, the network capacity may be determined based on available bandwidth, available connection points, and/or the like. The UEs 101*a*-101*n* are any type of mobile terminal, fixed terminal, or portable terminal including mobile handsets, mobile phones, mobile communication devices, stations, units, devices, multimedia tablets, digital book readers, game devices, audio/video players, digital cameras/camcorders, positioning device, televisions, radio broadcasting receivers, Internet nodes, communicators, desktop computers, laptop computers, Personal Digital Assistants (PDAs), or any combination thereof. Under this scenario, the UEs 101*a*-101*n* employ wireless links (e.g., cellular radio links) to access the communication network 105 and/or the media content providers 105*a*-105*m*. In addition or alternatively, it is contemplated that the UEs 101*a*-101*n* may have also have wired connections (e.g., wired Ethernet connections) to the network 105 and/or media content providers 105*a*-105*b*. It is also contemplated that the UEs 101*a*-101*n* can support any type of interface to the user (such as "wearable" circuitry, etc.). The UEs 101*a*-101*n* also include one or more media player applications (not shown) to present media content on a user interface of the UEs 101*a*-101*n*.

In one embodiment, the media segment manager 103 collects media feeds, streams, or content from multiple sources (e.g., the media content providers 105-105*m*) and presents these streams as media segments on the UE 101. In another embodiment, the media segment manager 103 may also harvest media content from other sources (e.g., a music service, a video service, or other service platform) and present these at the UE 101. More specifically, the media segment manager 103 receives commands and/or other information for defining media segments for presentation on the UE 101 or other device. As described with respect to the sample use scenario, the media segment manager 103 enables users to define segments (e.g., comprising media content or streams and an associated duration or period of time) for aggregating and automatically displaying media sources of interest to the user. The media segment manager 103 also provides a user interface (e.g., a graphical user interface (GUI)) for controlling the functions and settings of the media segment manager 103. By way of example, the GUI presents icons (e.g., horizontal bars) of several incoming media sources (e.g., TV channels or live video streams from the Internet). The length of the icon defines how long content from a media source will be shown to the user before the media segment manager 103 switches to showing the next source or stream. As noted previously, in one embodiment, the media sources or streams that are displayed in any one segment can be specified by the user or automatically defined using criteria specified by the user.

As one advantage of the approach described herein, the UE 101 need not expend resources receiving all incoming media sources. Instead, the UE 101 uses resources (e.g., bandwidth, processing resources, memory, etc.) to process only the currently playing stream and can then begin to buffer the next media source of the next segment. Thus, the segment manager 103 advantageously uses fewer resources (e.g., less data is transferred between the media content providers 105a-105m and the UE 101).

In one embodiment, the media segment manager 103 store information related to defined media segments, corresponding media sources, media selection criteria, and the like in a database 109 of segment data. In addition or alternatively, the segment database 109 can reside on one or more nodes connected directly or indirectly to the service manager 103 over the communication network 107. In other embodiments, the segment database 109 resides on one or more nodes in the communication network. More specifically, the segment database 109 includes one or more processes (not shown) and one or more data structures that store media segment related information as well as data, configurations, user profiles, variables, conditions, and the like associated with operation of the media segment manager 103 and/or the media segment applications 111a-111n. The media segment manager 103 may also direct the display of a user interface for interacting with media segments and the associated media content and/or streams. In one embodiment, these interactions include defining the content and duration of segments, specifying associated media streams, specifying criteria for automatically selecting media stream, generating a user interface, generating a programming guide of the media streams, and the like.

In certain embodiments, the media segment manager 103 interacts with one or more media segment applications 111a-111n executing at the UEs 101a-101n to coordinate the display of media segments. By way of example, the media segment applications 111a-111n may include or be associated with one or more media player applications which allow the user to define which media streams to receive (e.g., from the Internet, from nearby devices such as other UEs 101 or set-top boxes, from local file storage, from network file storage, etc.). The media segment applications 111a-111n may also define how long each segment is to be presented, the playback order of the segments, whether the segments should be looped, etc. In other embodiments, the media segment applications 111a-111n may perform the functions of the media segment manager 103. In this way, the system 100 need not include a media segment manager 103, and the media segment applications 111a-111n may operate in a peer-to-peer network topology to provide media content or streams for display in media segments.

In the example of FIG. 1, the media content or streams are provided by one or more of the content providers 105a-105m (e.g., music service content providers, online application or content stores, etc.). For example, the content providers 105a-105m may offer any combination of media content or streams originating from any number of sources including radio and television (TV) broadcasts received by the device (e.g., FM radio, DVB-H television, Internet Protocol TV, etc.), Internet media (e.g., live video feeds, web pages containing periodically or continuously updated content), media content stored on the UE 101, media content stored on other peer UEs 101a-101n, media content stored over the network 107, video games, etc.

In certain embodiments, the segment application 111a-111n handle the various sources of media content consistently without regard to the actual delivery method of the content. In other words, the segment applications 111a-111n and the segment manager 103 present the different available media content or streams from the various content providers 105a-105m as equally available. By way of example, application programming interfaces (APIs) specific to each provider 105, each type of media source (e.g., streaming media, downloaded media, etc.), or each media format can be used to implement a consistent media access frontend.

In some embodiments, the media segment manager 103 includes a web server or other online component (not shown) to provide access to media segment services and/or functions using, for instance, via browser applications 113a-113n executing on the UEs 101a-101n. In this way, the UEs 101a-101n need not execute specific media applications (e.g., segment application 111a-111n) to access the media content or streams as media segments. In some embodiments, it is contemplated that the functions of media segment manager 103 may be accessed on a first UE 101 for presentation one or more other UEs 101a-101n via the browser application 113 and/or the media segment application 111.

In one embodiment, the media segment manager 103 and one or more of the media content providers 105a-105m can be implemented via shared, partially shared, or different computer hardware (e.g., the hardware described with respect to FIG. 17). In another embodiment, the media segment service is a managed service provided by an operator of the communication network 107 or other service provider.

By way of example, the communication network 107 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

Moreover, the UEs 101s-101n, the media segment manager 103, and the media content providers 105a-105m communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the pair of the media segment application 111 and the media segment manager 103 and/or the pair of the media segment application 111 and the media content provider 105 interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

As noted previously, in other embodiments, the media segment applications 111a-111n may interact according to peer-to-peer protocols to share and distribute media content among the UEs 101a-101n without need of the segment manager 103 and/or the media content providers 105a-105m. In this way, each UE 101a may provide the functions of a segment manager as well as serve media content or streams to other UEs 101a-110n over the communication network 107 for presentation in media segments.

Figure 2:
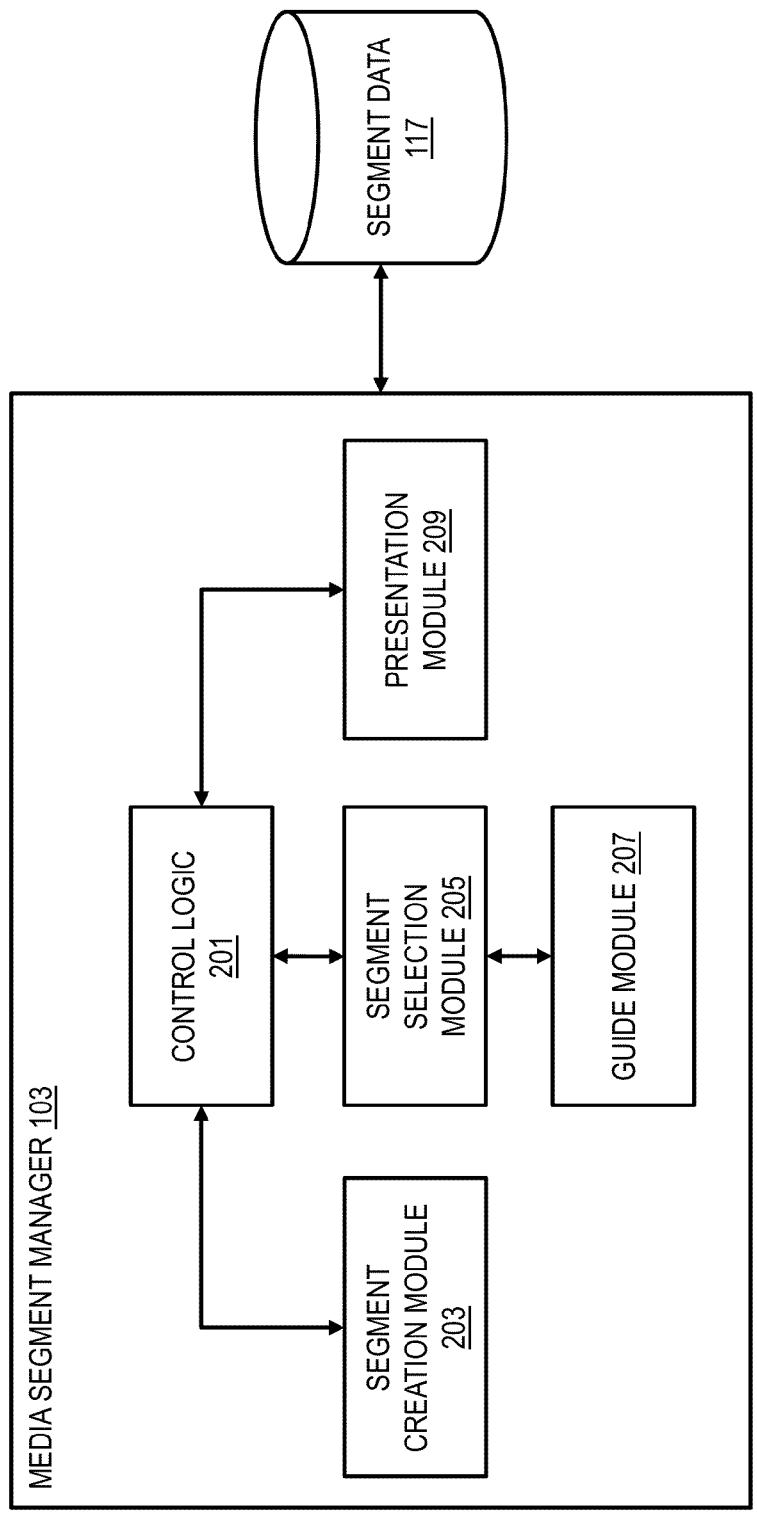
FIG. 2 is a diagram of the components of a media segment manager, according to one embodiment.

FIG. 2 is a diagram of the components of a media segment manager, according to one embodiment. By way of example, the content object binding manager 115a includes one or more components for presenting one or more media streams in one or more user-defined media segments. It is contemplated that the functions of these components may be combined in one or more components or performed by other components of equivalent functionality. In this embodiment, the media segment manager 103 includes at least a control logic 201 which executes at least one algorithm for executing functions of the segment binding manager 103. For example, the control logic 201 interacts with the segment creation module 203 to receive input from a device for specifying a plurality of media segments that each corresponds to one or more media streams and is associated with a period of time or duration for playing the one or more media streams. More specifically, the request identifies, for instance, how many segments to create, what media streams are to be played in each segment, in what order the segments should be played, and how long to play each segment before playing the next segment. In one embodiment, the request is received from the user via the media segment application 111 or the browser 113 executing on the UE 105. The information related to creation or defining the media segments are stored in the segment database 117.

Next, the control logic interacts with the segment selection module 205 to determine what media stream is to be played in each of the defined media segments. In one embodiment, the media segment manager 103 enables either a manual or automatic mode of operation. In a manual mode of operation, the user explicitly defines what media streams to present in each media segment. Referring to the sample use case described above, an example of a manually defined media segment is Segment 1 in which the user specified the presentation of a media stream (e.g., live broadcast) of a football game on a particular channel. To assist in making this manual selection, the segment selection module 205 can direct the guide module 207 to generate a programming guide listing the available media content or streams. In one embodiment, the guide module 207 sorts and presents the available media streams according to time and topic. The time, for instance, may be specified generally according to whether a particular media stream is scheduled for a future time, is occurring live, or has occurred in the past. In addition, the guide module 207 can organize the available media streams according to topics. By way of example, these topics may be based on the subject matter of the media content, user defined categories, or any other classification of the content. In an automatic mode of operation (also described previously), the user specifies criteria for the segment selection module 205 to use in automatically selecting the appropriate media stream.

After selection of the media streams for each media segment, the control logic 201 interacts with the with the presentation module 209 to initiate display, rendering, and/or playback of the segments in the user-specified predetermined order for the specified periods of time. In one embodiment, because the available media content or stream can take many forms (e.g., live video feeds, photographs, audio files, etc.) and can be delivered using any number means (e.g., streaming media, downloaded media, spontaneously created media, etc.), the presentation module 209 includes one or more sub-modules or APIs (not pictured) for receiving the media content in its native format or for converting the media content to a media format compatible with the presentation module 209. In other embodiments, the presentation module 209 may initiate the download or installation of the components (e.g., codecs, player applications, etc.) needed to playback the content or stream.

Figure 3:
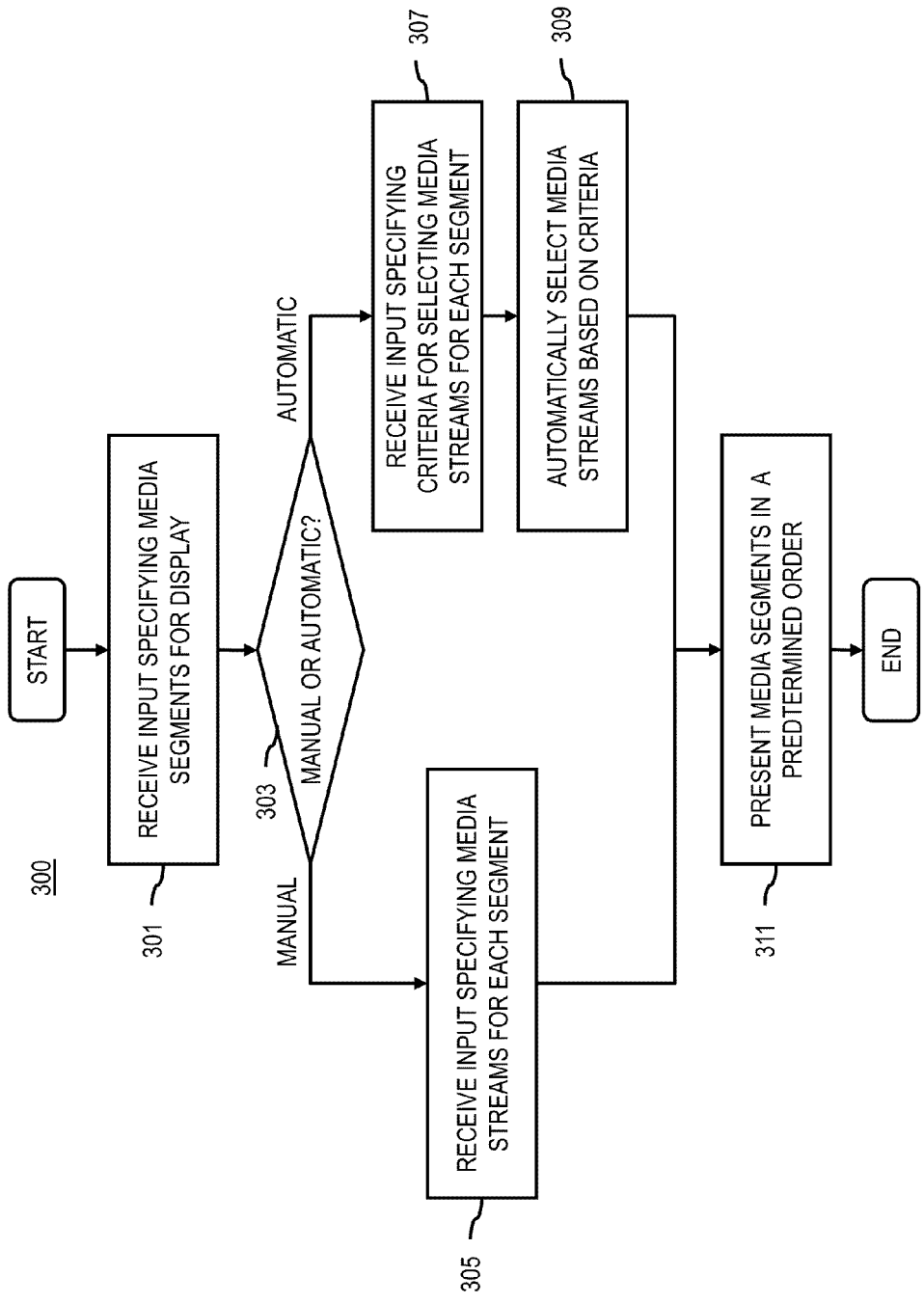
FIG. 3 is a flowchart of a process for presenting media segments, according to one embodiment.
Figure 12:
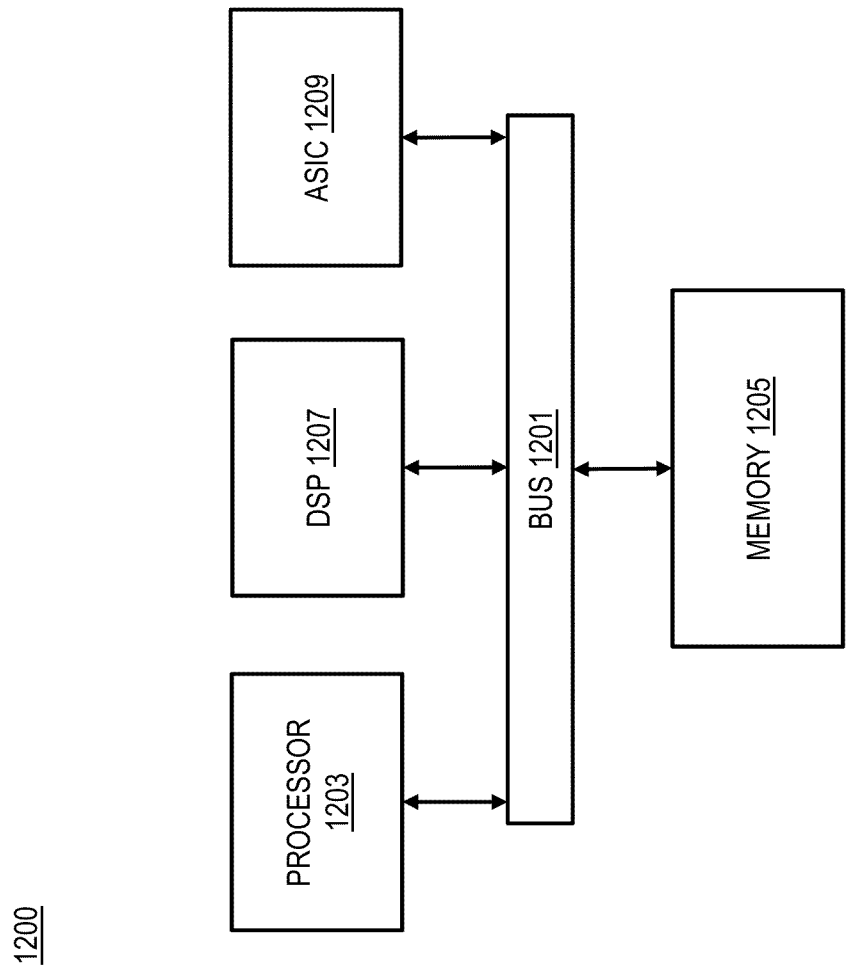
FIG. 12 is a diagram of a chip set that can be used to implement an embodiment of the invention.

FIG. 3 is a flowchart of a process for presenting media segments, according to one embodiment. In one embodiment, the media segment manager 103 performs the process 300 and is implemented in, for instance, a chip set including a process and a memory as shown in FIG. 12. In addition or alternatively, the media segment application 111 of the UE 101 may also perform the process 400. In step 401, the media segment manager 103 receives input specifying one or more media segments to present on the UE 101. For example, the user may access an input interface (e.g., an input GUI) by activating one or more buttons, commands, menu options, and the like to direct to the media segment manager 103 to define one or more media segments to present media content of interest to the user. It is contemplated that the input GUI may also be access remotely via a device (e.g., a computer) other than the UE 101 over the communication network 107. Additionally, the input interface may be based on non-graphical elements such as voice recognition, haptic feedback, audio alerts, etc.

Next, the media segment manager 103 determines whether the input includes information specifying whether the media segment manager 103 should operate in a manual or automatic mode of operation (step 303). If the information indicates or specifies a manual mode of operation, the media segment manager 103 can request that the UE 101 provide the user's input for specifying the media streams to play in each defined segment. In step 305, the media segment manager 103 receives the input (step 305). In one embodiment, the media segment manager 103 can determine whether the media stream is already specified in the input received at step 301 and extract the information from the input accordingly.

If the information indicates or specifies an automatic mode of operation, the media segment manager 103 requests and then receives input specifying criteria for automatically selecting media streams for presentation in each of the segments (step 307). In one embodiment, one or more criteria may be input and applied with equal weight or according to a predetermined weight. In addition, the criteria may be specified in a hierarchical fashion as described in more detail with respect to FIG. 5. The media segment manager 103 then apply the criteria to the set of media content or streams available over the communication network 107 (step 309). For example, the media segment manager 103 can construct queries based on the criteria and apply the queries to the metadata or other information (e.g., guide information available from the content providers 105) related to the media content or streams. The results of the queries are used to automatically select media streams based on the queries and criteria (step 309).

After selecting the media streams for each segment (e.g., either manually, automatically, or a combination thereof), the media segment manager 103 presents or initiate presentation of the media segments in a predetermined order (step 311). As with the selection of the media streams, the predetermined order may be specified manually or automatically according to user-defined criteria. In some embodiments, if no order of the segments is specified, the media segment manager 103 can default to playing back the segments in sequential order or another predetermined order (e.g., shortest segment first, longest segment first, alternating long and short segments, etc.).

Figure 4:
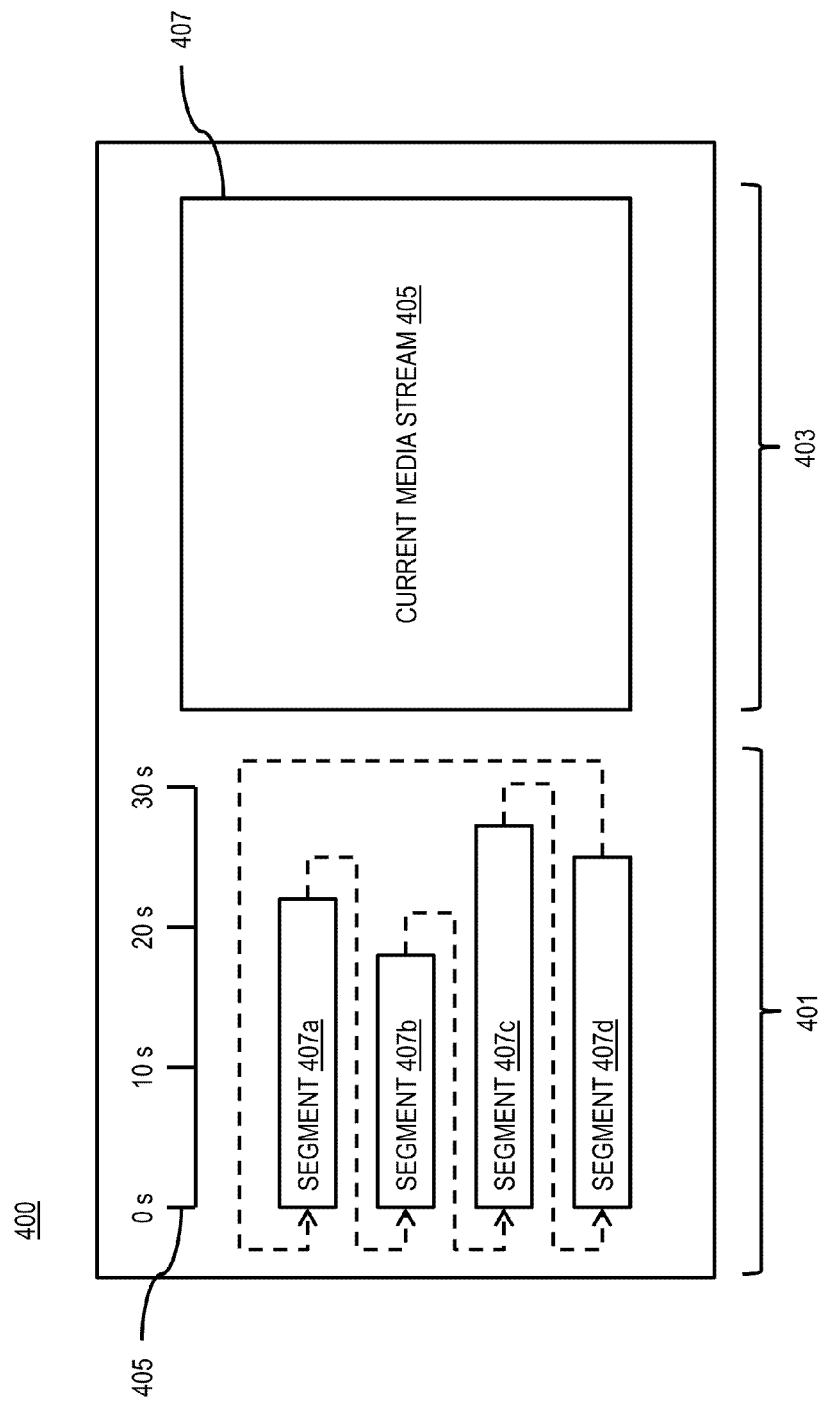
FIG. 4 is a diagram of a user interface used in the process of FIG. 3 for presenting media segments, according to one embodiment.

FIG. 4 is a diagram of a user interface used in the process of FIG. 3 for presenting media segments, according to one embodiment. As shown in FIG. 4, the user interface 400 is divided into two main parts: (1) a section 401 for showing graphical representations (e.g., icons) of the segments; and (2) a section 403 for displaying the currently playing media stream. In this example, the section 401 includes a timeline bar 405 providing a timescale to show the duration of each of the segments 407a-407d, In one embodiment, the timescale can be adjusted by zooming in or out. Each of the segments is played for an amount of time that is, for instance, specified by the user, content provider 105, network operator, service provider, advertiser, or a combination thereof. The graphical representation reflects the order in which the segments will be played as indicated by the dotted lines. For example, segment 407a will play for approximately 22 seconds, followed by segment 407b for 17 seconds, segment 407c for 26 seconds, and segment 407d for 24 seconds. At the end of segment 407d, playback loops back to segment 407a to begin another cycle.

In the section 403, the media segment manager 103 presents the content media stream 405 in a display area 407. By way of example, if the media stream is video, the video content can be shown in display are 407. If the media stream is an audio file or music, the display area 407 may show information about the currently playing track (e.g., album art, file metadata, playback time, etc.). Similarly, if the media stream is a series of photographs, the display area 407 presents the photographs.

Figure 5:
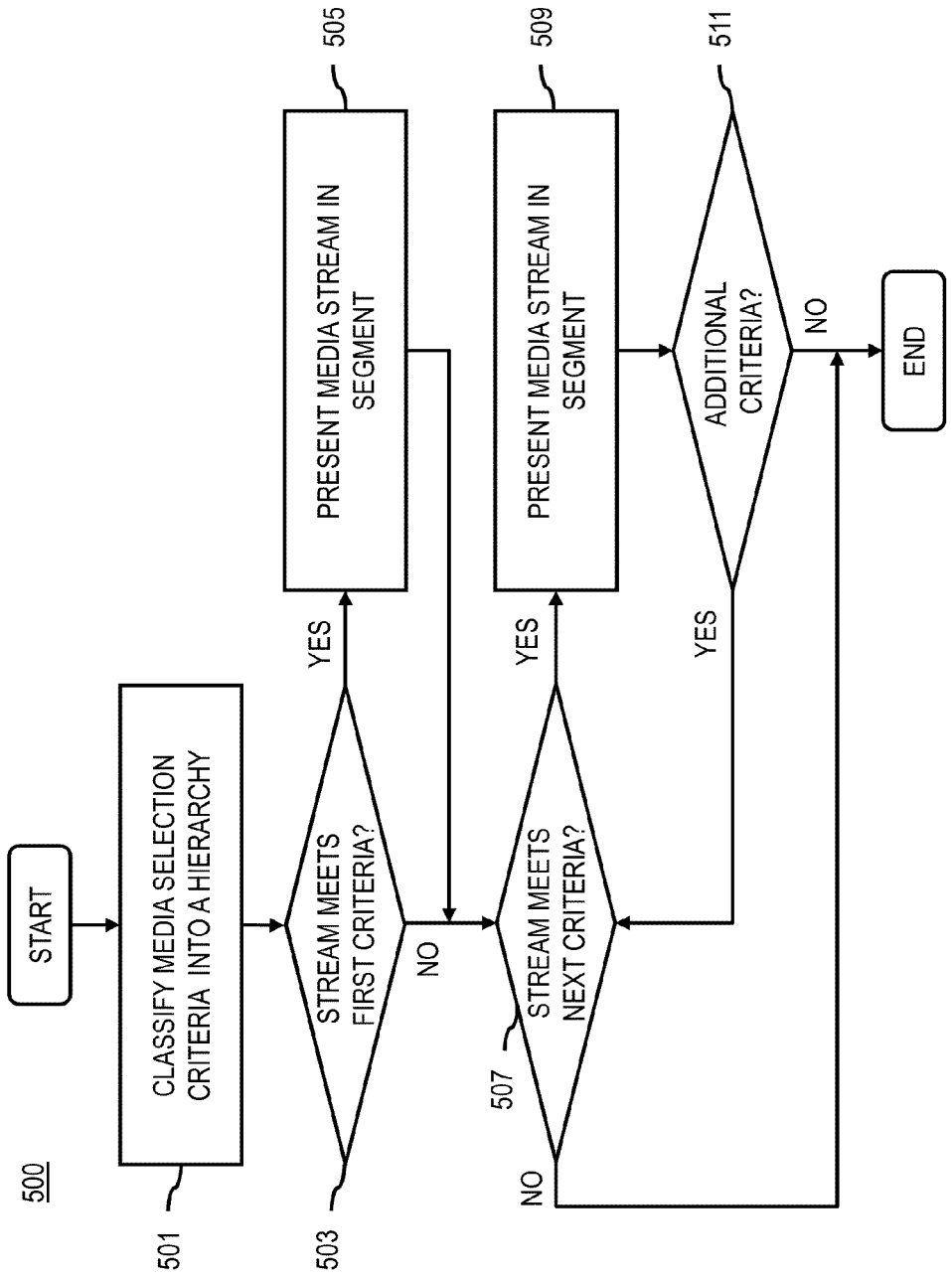
FIG. 5 is a flowchart of a process for applying a hierarchy of criteria for automatically defining media streams to include in a media segment, according to one embodiment.

FIG. 5 is a flowchart of a process for applying a hierarchy of criteria for automatically defining media streams to include in a media segment, according to one embodiment. In one embodiment, the media segment manager 103 and/or the media segment application 111 perform the process 500 and are implemented in, for instance, a chip set including a process and a memory as shown in FIG. 12. The process 500 assumes that the user has elected to specify criteria for automatically selecting media streams for one or more of the defined media segments. In step 501, the media segment manager 103 classifies one or more of the criteria for automatically selecting media streams into a hierarchy or a set of rules the media segment manager 103 follows when automatically selecting content for each of the defined media segments. The set of rules include definitions of the criteria for selecting primarily preferred media streams. The rules also contain criteria for selecting secondary preferred content, tertiary preferred, and so on. It is contemplated that the set or rules or hierarchy of criteria may include any number of levels.

The criteria (primary, secondary, tertiary, etc.) may include, but is not limited to, a specific combination of the one or more of the preferences listed in Table 1 below. It is noted that, in one embodiment, location may be applied as criteria in, at least, two different ways. For example, one location preference may specify criteria (e.g., broadcast location criteria) for selecting content that originates or is broadcast from a particular location or region (e.g., content that is broadcast from Europe). A second location preference may specify criteria (e.g., location topic criteria) for selecting content that is about a particular location or region (e.g., content that is about Europe).

TABLE 1

| A. Content Source | B. Content Details | C. Popularity | D. Age Rating | E. Other Preferences |
|---|---|---|---|---|
| Video sharing site | Live video feed | Most watched globally | Suitable for all ages | Person (creator, actor) |
| Television Channel | TV program Movie | Least watched globally | Above 12 Above 15 | Broadcast location |
| Video game Web site Friend's device Random | Keywords Random | Most watched in user's social network Least watched in user's social network | Above 18 Above 21 | Location topic Genre I haven't seen before I have seen before |

TABLE 1-continued

| A. Content Source | B. Content Details | C. Popularity | D. Age Rating | E. Other Preferences |
|---|---|---|---|---|
| | | | | Language Mobile video (location, heading) |

In one embodiment, the criteria in Table 1 can be presented as a selection list from which the user may check one or more criteria. For example, to define a primary set of criteria, the user may select or "tick" any combination of the above criteria. For a second set of criteria, the user may select another combination and so on. By way of example, the user may define the primary criteria as follows: Content source=video sharing site; Content details=live video feed; popularity=most watched in user's social group; Age rating=suitable for all ages; and Location=Rome. Additionally, a second set of criteria may be defined as follows: Content source=television channel; content details =movie; popularity=most watched globally; Age rating=Above 15; Location=Rome.

In another embodiment, the definition of the criteria can be made by entering the criteria in free text. The free text can then be parsed using, for instance, a natural language analytical model to determine or categorize the criteria in the free text. In yet another embodiment, when a user has defined for a particular media segment the primary, secondary, tertiary, etc. selection criteria, these criteria can be considered as the rule set or hierarchy for selecting content for that segment.

In step 503, the media segment manager 103 tries to obtain media streams or content (e.g., from a selected media source or content provider 105) that meet the primary criteria set of the rule set. If there is a match, the media segment manager selects the matching media stream or streams for presentation during the corresponding segment. If the media segment manager 103 is unable to find content matching the primary criteria or if the media segment manager 103 is configured to selected media streams from multiple levels of the criteria hierarchy, the media segment manager 103 determines whether there are any media streams that meet each subsequent set of criteria in the rule set or hierarchy (step 507). If there is a match, the media segment manager 103 selects the matching media streams for presentation during the corresponding media segment (step 509) and continues matching against each subsequent set of criteria until all criteria are exhausted (step 511).

In one embodiment, when a media segment is presented to the user, and content fitting the primary criteria is not available, the media segment manager 103 shows content fitting the secondary criteria. If the primary content becomes available while the secondary content is shown, the media segment manager 103 may switch to show the primary content until the end of the segment. Alternatively, the system may keep showing the secondary content until the end of the segment, but show the primary content when it is the segment's turn to be shown again.

As discussed previously, if multiple media streams match the criteria for presentation during the same segment, the media segment manager 103 may display one matching media stream each time playback of the segments is looped. Alternatively, the media segment manager 103 may divide the available time period for a particular media segment among the one or more media streams to be presented during the segment. As part of the rule-set or hierarchy for the segment, the user may define which presentation method the user prefers.

Figure 6:
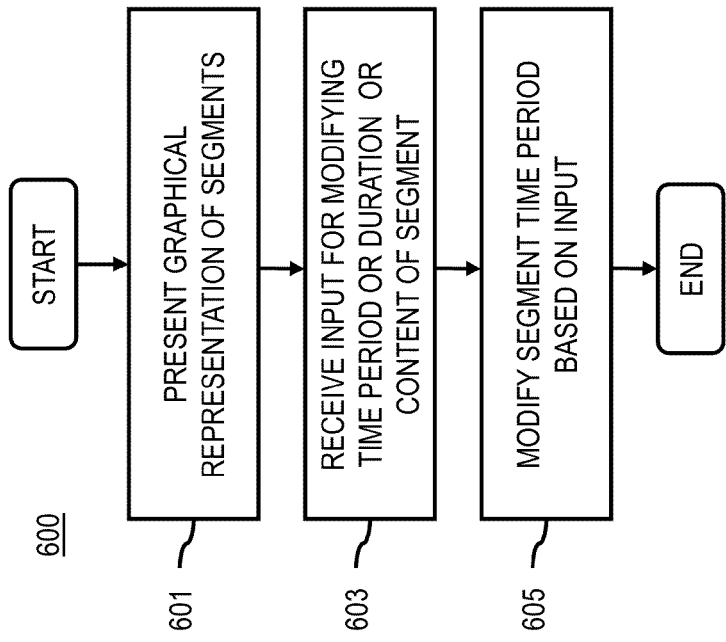
FIG. 6 is a flowchart of a process for modifying the duration of a media segment, according to one embodiment.

FIG. 6 is a flowchart of a process for modifying the duration of a media segment, according to one embodiment. In one embodiment, the media segment manager 103 and/or the media segment application 111 perform the process 600 and are implemented are implemented in, for instance, a chip set including a process and a memory as shown in FIG. 12. The process 600 assumes that the user has already created a set of media segments for displaying media streams. In step 601, the media segment manager 103 displays a graphical representation of the segments to the user. The graphical representation may depict the order of the segments, content of the segments, and/or duration of the segments. In addition or alternatively, the media segments may be displayed in a non-graphical interface (e.g., text, audio, etc.).

On viewing or otherwise receiving the representation of the media segments, the user may choose to modify the time period or duration, or content of one of the previously defined media segments. In one embodiment, the user may indicate the modification directly on the user interface. For example, if the user interface is graphical in nature, the user may manipulate the graphics to indicate a modification. Similarly, if the user interface is audio in nature, the user may issue voice commands to direct changes. The media segment manager 103 then receives the input from the user (step 603) and modifies the media segments accordingly (step 605). The modifications are then reflected in the corresponding user interface.

Figure 7B:
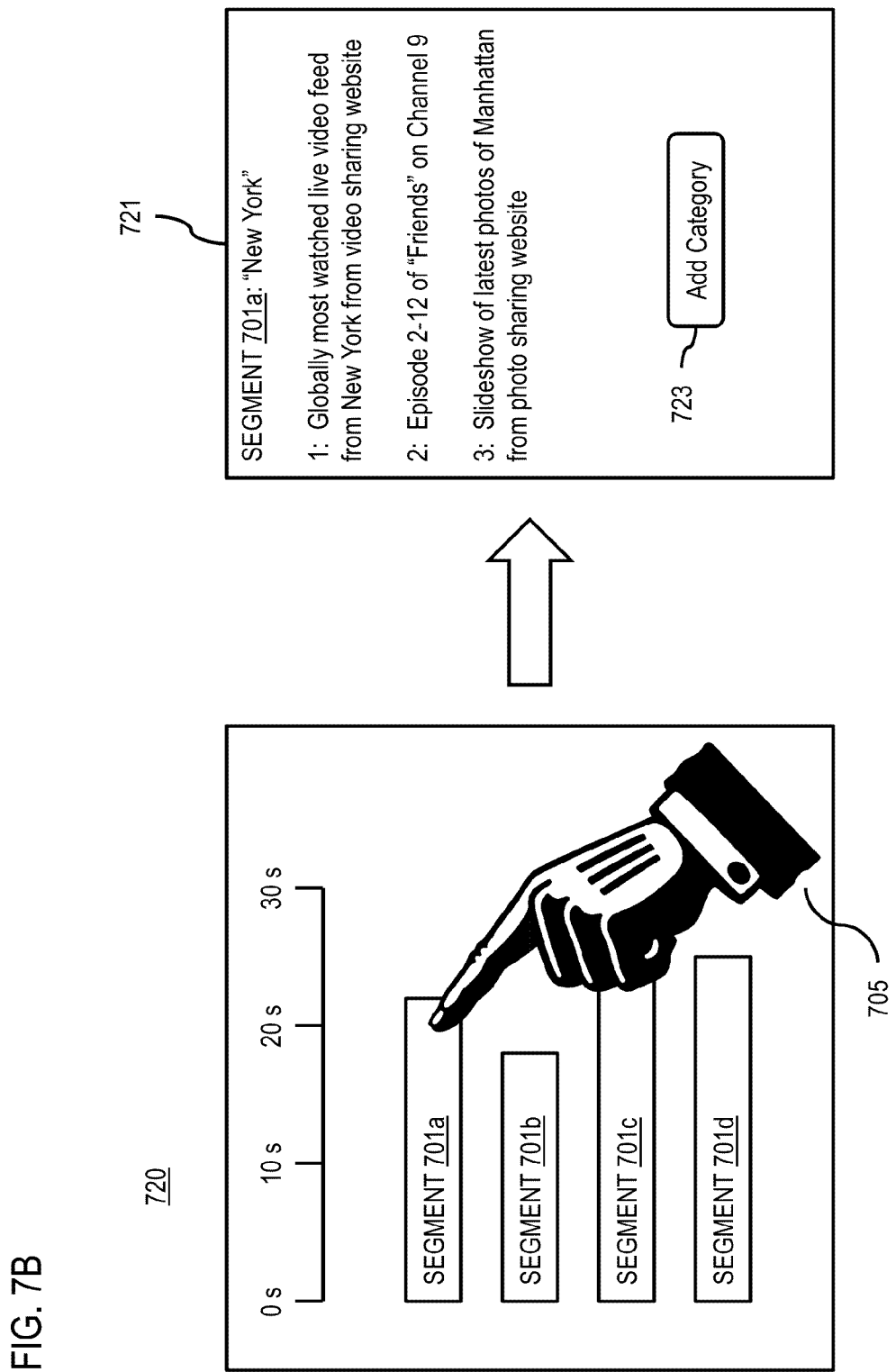

FIGS. 7A and 7B are diagrams of user interfaces used in the process of FIG. 6 for modifying the duration and content, respectively, of a media segment, according to one embodiment. The user interface 700 of FIG. 7A provides for touch-enabled or gesture-based manipulation of the time duration of each of the previously defined media segments (e.g., segments 701a-701d). The user interface 700 is similar to the user interface described with respect to FIG. 4. That is, the user interface 700 is divided into two sections that depict the media segments 701a-701b on the left side of the screen and the current media stream 703 on the right side of the screen. In this example, the user 705 selects the segment 701b and modifies its duration by dragging the graphical representation of the segment 701b to the right to lengthen the segment. The amount of additional time added to the segment is gauged by the timeline bar 707. In this way, the user can quickly and easily select and adjust the duration of each segment relative to the other segments. In one embodiment, the user 705 may drag the graphical representation of the segment 701b beyond the duration of the timeline bar 707 (e.g., to extend the duration of the segment 701b beyond 30 seconds). In this case, the graphical representation of the segment 701b may temporarily partially occlude the element 703 of the current media stream. However, when the user has completed the process to define the new duration of the 701b, the duration stated in the timeline bar 707 and the graphical representations of the segments 701a-701d are rescaled to reflect the new duration and to fit within the display area of the user interface 700 allotted to displaying segment duration.

The user interface 720 of FIG. 7B provides for touch-enabled or gesture-based control of the media content or streams to be presented in the media segments 701a-701d. In the example of FIG. 7B, the user 705 selects the segment 701a to view and/or modify the media streams presented therein. On selecting the graphic representation of the segment 701 a, another window 721 is displayed to show the current contents of the segment 701a. As shown, the segment 701a is titled "New York" and includes three media streams or criteria for media streams the user has defined for the segment. In this example, for segment 701a, the user's first choice is the most globally watched live video feed from New York provided by users of a video sharing website. If such content is unavailable when it is time to show the segment 701a, the media service manager 103 looks for content that matches the user's secondary choice, which is in this case, Episode 2-12 of "Friends" on Channel 9. If the secondary content is unavailable, the media service manager 103 looks for content that is a slideshow of the latest photos of Manhattan from a photo sharing website. In certain embodiments, these criteria may include both broadcast location criteria (e.g., the first and third criteria) and a location topic criterion (e.g., the second criteria). In other words, the first criterion (e.g., live video from New York) and third criterion (e.g., photos of Manhattan) select media or media streams that are broadcast from New York, and the second criterion (e.g., a Friends episode) selects for content that is about New York. The broadcast location criteria, for instance, advantageously enables a user to quickly filter and group content originating from a particular location regardless of the subject the content or media. The user can also add additional categories by selection the option 723. In one embodiment, the user may select the new category from a predefined list or menu. In addition or alternatively, the user may enter preferences for the new category as free text (not shown in this figure). The user may also drag the segments 701a-701d to different positions to change the order for playback of the segments.

Figure 8B:
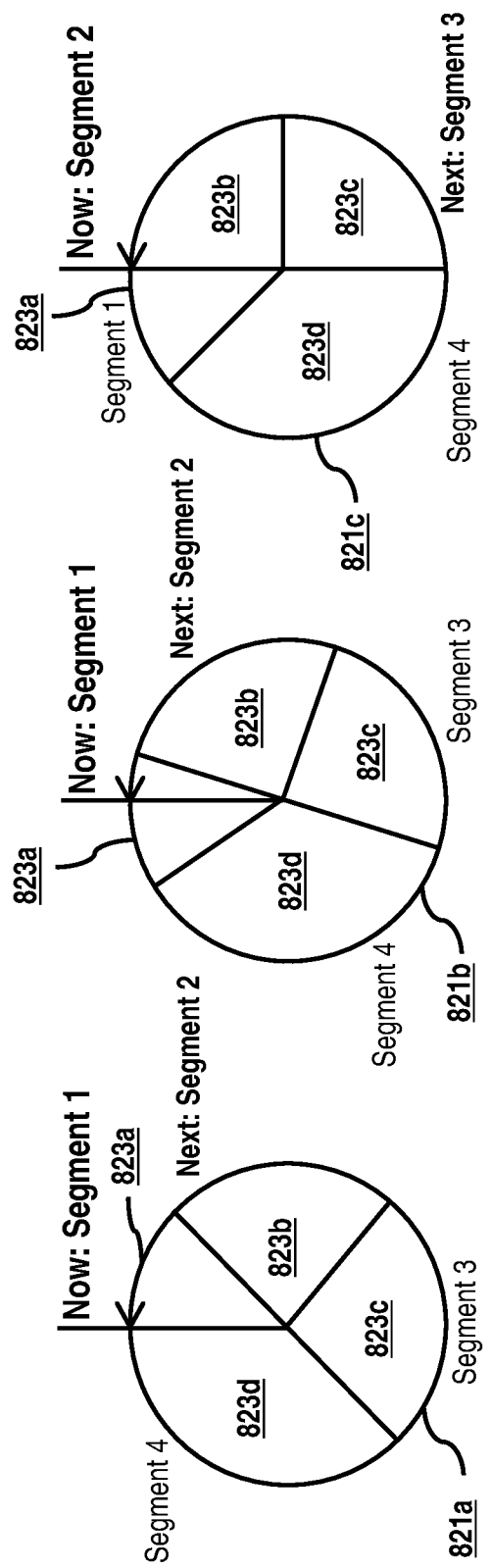

FIGS. 8A and 8B are diagrams of alternate user interfaces used in the process of FIG. 3 for presenting media segments, according to various embodiments. FIGS. 8A and 8B depict user interfaces that show the same information as depicted in the user interface 400 of FIG. 4 using different graphical elements. As shown in FIG. 8A, the user interface 800 maximizes the display area 801 for display of the current media stream 803. In this example, the duration of each segment 805a-805c is manipulated in a single track 807 as opposed to individual icons for each segment as shown in FIG. 4. In one embodiment, the track 807 can be scrolled horizontally on the screen, so its length is not fixed. New segments can be inserted into the track by, for instance, dragging and dropping the segment in the desired position of the track 807. The current point-in-time is indicated by the marker 809. This marker moves as the playback of the segment progresses.

FIG. 8B depicts a user interface 820 in which a set of segments is represented by a wheel 821a-821c. The wheels 821a-821c depict the same set of segments at various points during playback of the segments, where each sector (e.g., sectors 823a-823b) represents a segment. In this example, the content shown in the wheel lasts for a period time (e.g., 60 seconds). The user can change this total time and thus adjust the duration of each segment. The user may change the duration of a segment by altering the size of the respective sector 823 using, for instance, a touch screen. In one embodiment, the period of time associated with the wheel 821 is fixed. Therefore, if the user adds additional time to one sector (e.g., sector 823a), the time allotted to the other sectors 823b-823d is reduced accordingly. For example, if the user enlarges the sector 823a by 20 seconds, the duration of the other sectors 823b-823d would be reduced by a collective 20 seconds. The reduction may occur equally across all segments or based on preferences configured by the user for each of the segments. In another embodiment, the period of time associated with the wheel 821 is not fixed. In this case, if the user adds additional time to one sector 823a, the total time associated with the wheel 821 is increased to reflect the additional time and no changes are made to the duration of the other sectors 823b-823d. The progress of the time can be presented to the user in at least two alternative ways: (1) the wheel 821 rotates counter-clockwise and the current position is indicated by the straight line at the upper part of the wheel; or (2) the wheel 821 does not rotate, but a radius line indicating the current playback position rotates similarly to a radar display.

Figure 9:
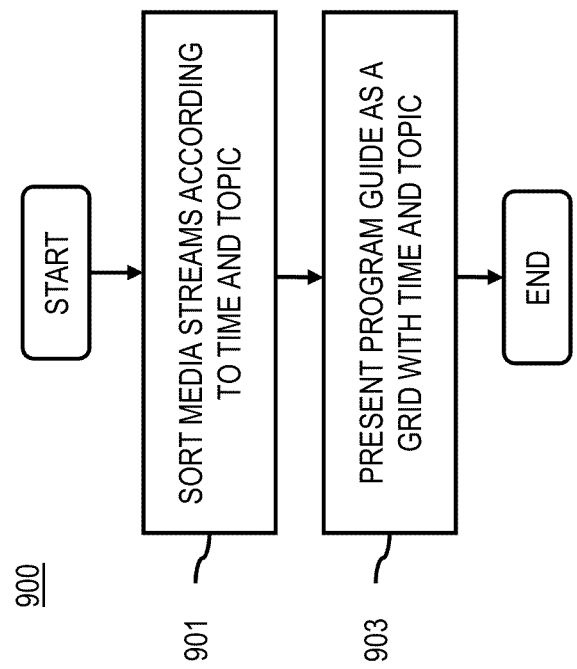
FIG. 9 is a flowchart of a process for presenting media streams in a programming guide, according to one embodiment.

FIG. 9 is a flowchart of a process for presenting media streams in a programming guide, according to one embodiment. In one embodiment, the media segment manager 103 and/or the media segment application 111 perform the process 900 and are implemented are implemented in, for instance, a chip set including a process and a memory as shown in FIG. 12. In step 901, the media segment manager 103 determines a set of media content or streams available from the content providers 105a-105m and other UEs 101a-101n and sorts the set according to time and topic. In one embodiment, the time is not expressed as a time reading based on hours, minutes, and seconds (e.g., 12:35:00 pm). Instead, the time is categorized according to future, live (present), and past. In addition to time, the media service manager 103 also categorizes the media streams according to topic. These topics may represent any category that can be applied to the streams (e.g., favorites, recommended, summer vacation, etc.).

Once sorted, the media service manager can group the media streams according to time and topic and present the groupings in programming guide (step 905). By way of example, the programming guide can be a grid as described with respect to FIG. 10.

FIG. 10 is a diagram of a user interface used in the process of FIG. 9 for presenting media streams in a programming guide, according to one embodiment. The user interface 1000 is an interface to, for instance, a service that collects media content and streams (e.g., live video feeds) and creates a comprehensive guide for selecting the offered media content or streams. As shown, the vertical axis 1001 organizes media streams into "live" (e.g., broadcasting now), "future" (e.g., planned broadcasts), and "past" (e.g., broadcasts stored locally or on a server). The horizontal axis 1001 organizes media streams according to topics. For example, topics include favorites, recommended, videos from New York, and other. In this example, the "videos from New York" topic includes video or media streams that are broadcast from New York. Videos that are "about New York" (as opposed to "from New York") may be categorized separately in the other column. Media streams (e.g., represented by squares in FIG. 10) are then group into the corresponding grid box created by the vertical lines of time and the horizontal lines of topic. In one embodiment, the user interface 1000 can be presented to the user, when the user selects media streams to include in a media segment.

The processes described herein for providing presenting media segments may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
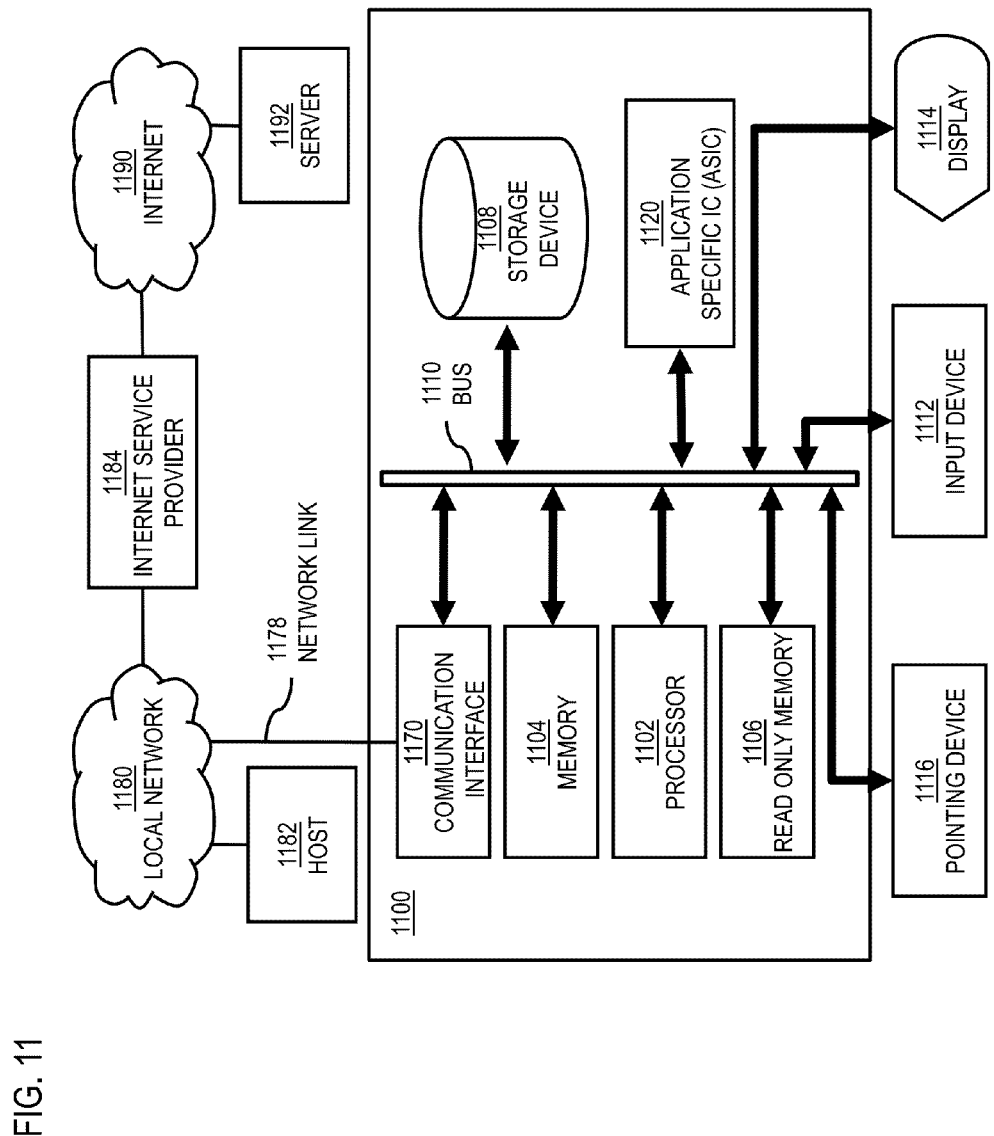
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to present media segments as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of presenting media segments.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to present media segments. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for presenting media segments. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for presenting media segments, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for presenting media segments.

The term "computer-readable medium" as used herein to refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set 1200 upon which an embodiment of the invention may be implemented. Chip set 1200 is programmed to present media segments as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of presenting media segments.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to presenting media segments. The memory 1205 also stores the data associated with or generated by the execution of the inventive steps.

Figure 13:
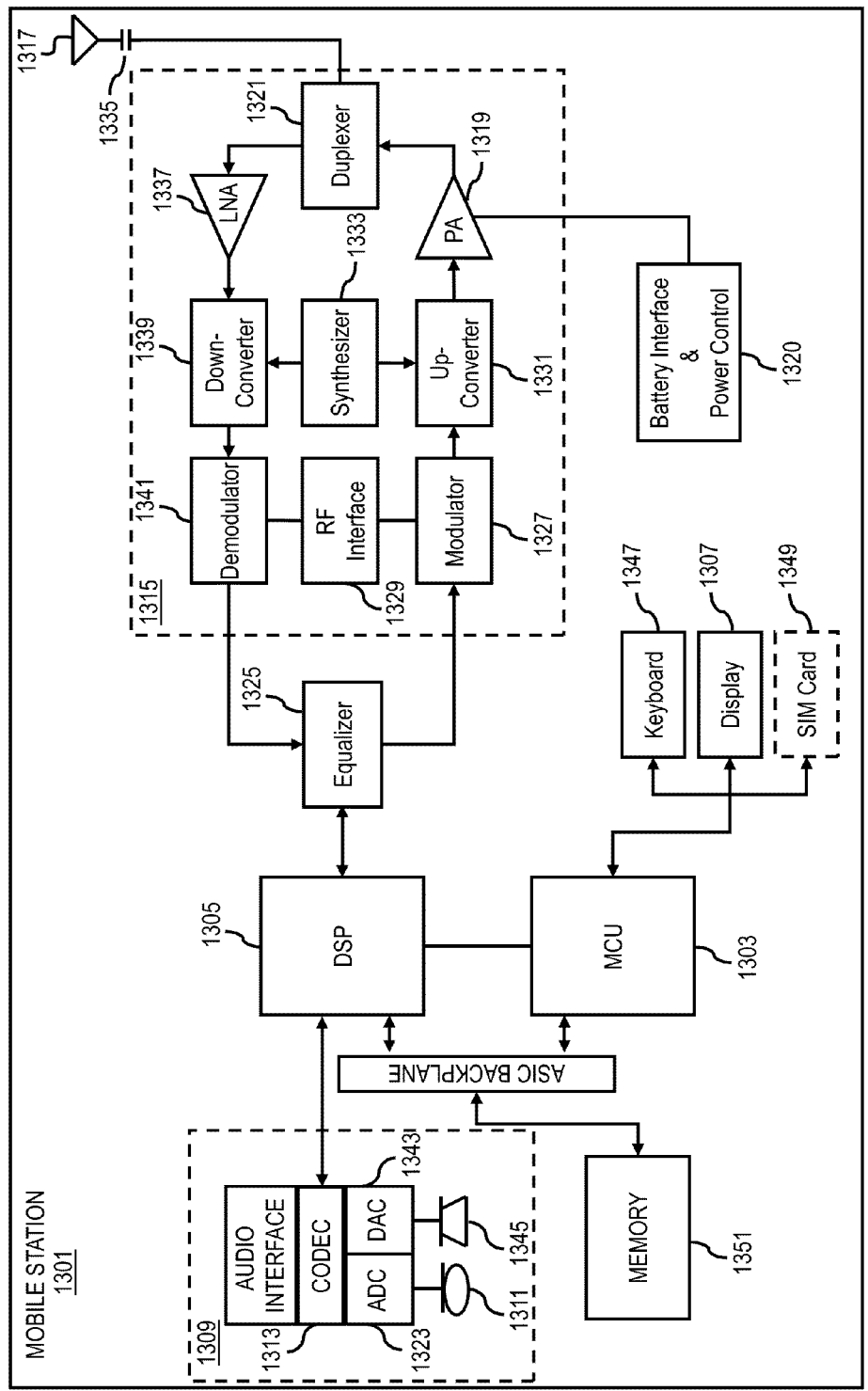
FIG. 13 is a diagram of a mobile terminal (e.g., a handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1300, or a portion thereof, constitutes a means for performing one or more steps of presenting media segments. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of presenting media segments. The display 13 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to present media segments. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    receiving at an apparatus an input, from a subscriber device, for specifying a plurality of segments, wherein each of the plurality of segments corresponds to one or more media streams and is associated with a respective duration of time, wherein the one or more media streams include one or more live media streams; and
    causing, at least in part, by the apparatus presentation of the plurality of segments at the device in a predetermined order based on the input and the respective durations of time.

2. A method of claim 1, further comprising:
    causing, at least in part, presentation of a graphical representation identifying each of the plurality of segments and the respective duration of time;
    receiving another input, from the device, for modifying the respective duration of time associated with a selected one of the plurality of segments; and
    modifying the respective duration of time associated with the selected one of the plurality of segments based on the another input.

3. A method of claim 1, wherein the one or more media streams corresponding to each of the plurality of segments are defined manually, the method further comprising:
    receiving another input, from the device, for defining the one or more media streams with respect to the plurality of segments.

4. A method of claim 1, wherein the one or more media streams corresponding to each of the plurality of segments are defined automatically, the method further comprising:
    receiving another input, from the device, for specifying one or more criteria for defining the one or more media streams; and
    automatically selecting the one or more media streams for presentation during a respective segment based on the one or more criteria.

5. A method of claim 4, wherein the another input includes information specifying a hierarchy for the one or more criteria, the method further comprising:
    classifying the one or more criteria to include a primary criterion and one or more lower level criteria;
    determining whether the one or more media streams satisfy the primary criteria; and
    if the one or more media streams do not satisfy the primary criteria, determining whether the one or more media streams satisfy each subsequent lower level criterion.

6. A method of claim 4, wherein the one or more criteria include criteria related to a source, a type, a popularity, a rating, a keyword, metadata, broadcast location, or a combination thereof corresponding to the one or more media streams.

7. A method of claim 1, wherein the one or more media streams include one or more future media streams, television broadcasts, radio broadcasts, video games, dynamic web pages, locally stored media streams, network stored media streams, or a combination thereof.

8. A method of claim 1, further comprising:
    sorting the one or more media streams according to time and topic; and
    causing, at least in part, presentation of a programming guide comprising a grid with the time on a first axis of the grid and the topic on a second axis of the grid,
    wherein representations of the media streams are displayed in the grid according to the sorting.

9. A method of claim 8, wherein the time is expressed as past, live, and future media streams.

10. A method of claim 1, further comprising:
    causing, at least in part, presentation of segments of the one or more live media streams of different content sources at the device in a predetermined loop based on the input and the respective durations of time.

11. A method of claim 1, wherein the one or more live media streams include one or more live media streams captured by another subscriber device nearby the device, live media streams captured by another subscriber device and available from a social networking web site, or a combination thereof 12. A method of claim 1, wherein the apparatus is embedded in the device or another subscriber device.

13. An apparatus comprising:
    at least one processor; and
    at least one memory including computer program code, the at least one memory and the computer program code configured to, with the at least one processor, cause the apparatus to perform at least the following, receive an input, from a subscriber device, for specifying a plurality of segments, wherein each of the plurality of segments corresponds to one or more media streams and is associated with a respective duration of time, wherein the one or more media streams include one or more live media streams, and cause, at least in part, presentation of the plurality of segments at the device in a predetermined order based on the input and the respective durations of time.

14. An apparatus of claim 13, wherein the apparatus is further caused to:

cause, at least in part, presentation of a graphical representation identifying each of the plurality of segments and the respective duration of time;

receive another input, from the device, for modifying the respective duration of time associated with a selected one of the plurality of segments; and modify the respective duration of time associated with the selected one of the plurality of segments based on the another input.

15. An apparatus of claim 13, wherein the one or more media streams corresponding to each of the plurality of segments are defined manually, and the apparatus is further caused to:

receive another input, from the device, for defining the one or more media streams with respect to the plurality of segments.

16. An apparatus of claim 13, wherein the one or more media streams corresponding to each of the plurality of segments are defined automatically, and the apparatus is further caused to:

receive another input, from the device, for specifying one or more criteria for defining the one or more media streams; and automatically select the one or more media streams for presentation during a respective segment based on the one or more criteria.

17. An apparatus of claim 16, wherein the another input includes information specifying a hierarchy for the one or more criteria, and the apparatus is further caused to:

classify the one or more criteria to include a primary criterion and one or more lower level criteria;

determine whether the one or more media streams satisfy the primary criteria; and if the one or more media streams do not satisfy the primary criteria, determine whether the one or more media streams satisfy each subsequent lower level criterion.

18. An apparatus of claim 16, wherein the one or more criteria include criteria related to a source, a type, a popularity, a rating, a keyword, metadata, broadcast location, or a combination thereof corresponding to the one or more media streams.

19. An apparatus of claim 13, wherein the one or more media streams include one or more future media streams, television broadcasts, radio broadcasts, video games, dynamic web pages, locally stored media streams, network stored media streams, or a combination thereof.

20. A non-transitory computer-readable storage medium carrying one or more sequences of one or more instructions which, when executed by one or more processors, cause an apparatus to at least perform the following steps:

receiving an input, from a subscriber device, for specifying a plurality of segments, wherein each of the plurality of segments corresponds to one or more media streams and is associated with a respective duration of time, wherein the one or more media streams include one or more live media streams; and causing, at least in part, presentation of the plurality of segments at the device in a predetermined order based on the input and the respective durations of time.

21. A non-transitory computer readable storage medium of claim 20, wherein the apparatus is caused to further perform:

receiving another input, from the device, for specifying one or more criteria for defining the one or more media streams; and automatically selecting the one or more media streams for presentation during a respective segment based on the one or more criteria.

* * * * *